Figure 3:
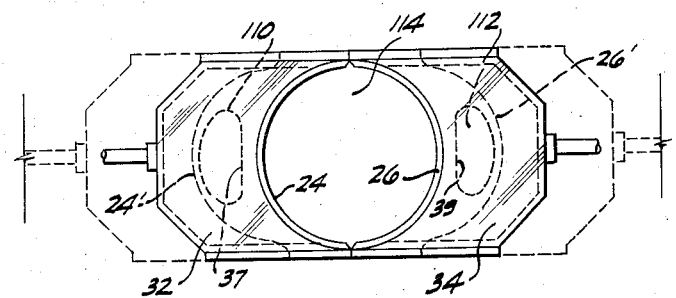

Jan. 27, 1959     W. L. BEWLEY ET AL     2,871,170
SOLIDS-FLUID CONTACTING APPARATUS
Filed March 15, 1956               2 Sheets—Sheet 1
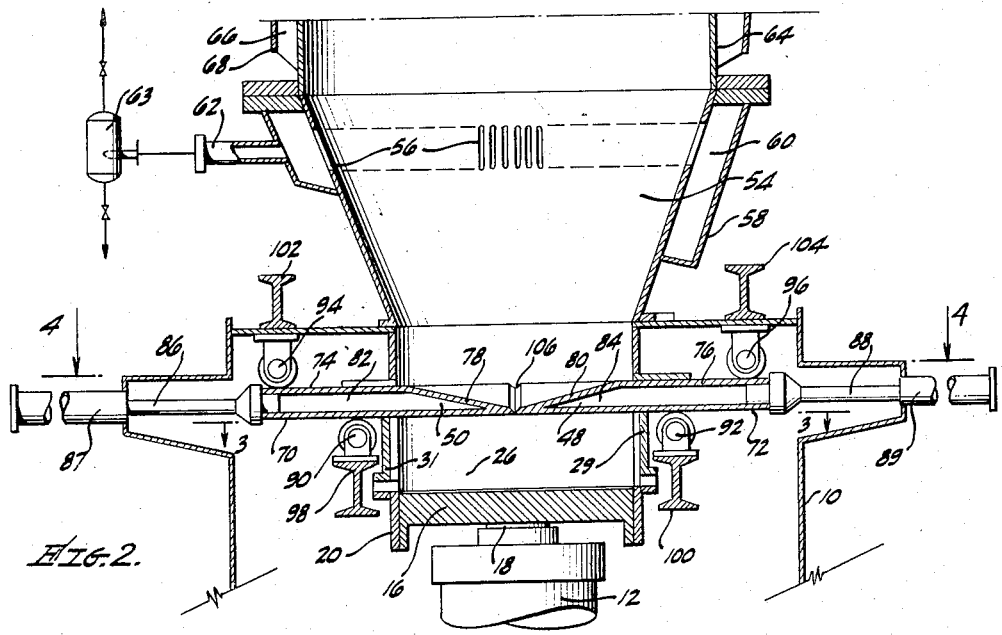
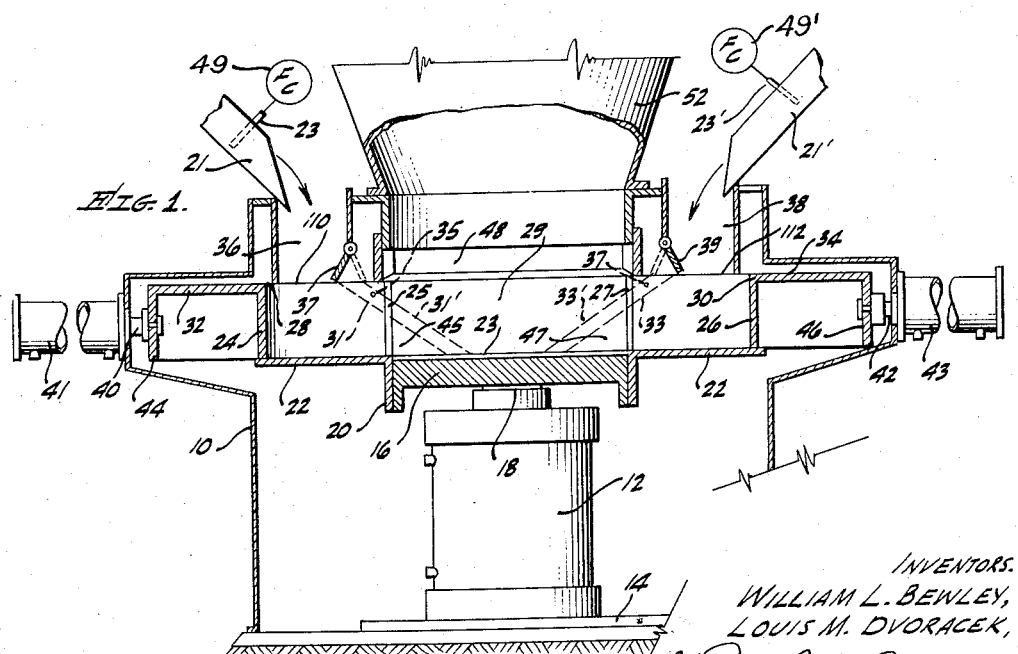
INVENTORS.
WILLIAM L. BEWLEY,
LOUIS M. DVORACEK,
BY
ATTORNEY.

Jan. 27, 1959 W. L. BEWLEY ET AL 2,871,170
SOLIDS-FLUID CONTACTING APPARATUS
Filed March 15, 1956 2 Sheets-Sheet 2

INVENTORS.
WILLIAM L. BEWLEY,
LOUIS M. DVORACEK,
BY
ATTORNEY.

United States Patent Office 2,871,170
Patented Jan. 27, 1959

2,871,170

SOLIDS-FLUID CONTACTING APPARATUS

William L. Bewley and Louis M. Dvoracek, Long Beach, Calif., assignors to Union Oil Company of California, Los Angeles, Calif., a corporation of California Application March 15, 1956, Serial No. 571,828

9 Claims. (Cl. 202—93)

This invention relates to an apparatus for solids-fluid contacting, and particularly relates to the heat treating of solids in the presence of heated fluids. The invention is especially adapted to the heat treating of oil-producing or oil-containing solids to recover an oil or gas fraction, or both, from such solids. The oil-producing or oil-containing solids contemplated in the present invention include oil shale, bituminous materials such as tar sand and oil saturated diatomaceous earth, bituminous coal, etc. The invention is also applicable in the production of synthesis gas by the reaction of gas containing steam with carbonaceous solids such as coal, coke, and the like.

The recovery of hydrocarbon gases and liquids from such solids as named above is well known. In the prior art processes, this recovery was accomplished by subjecting the solids to sufficiently high temperatures to separate the oils and gases in the form of a vapor from the mineral residue. In some of these processes the solids are passed downwardly as a moving bed by gravity through a column in which they are gradually heated by one means or another to an oil and gas producing temperature. The spent mineral residue is removed at the bottom of the column and discarded while the gas and oil vapors flow from the top and are separately cooled and condensed. Such processes require much heat, and large quantities of condensing cooling water are utilized. Thermally the processes are very inefficient because the heat employed to raise the temperature of the solids is largely lost from the process in producing hot spent solids and in cooling and condensing the product.

In an attempt to make the process more efficient some processes introduce oxygen into contact with the spent solids to produce heat by combustion. The heat is transmitted into the fresh solids to raise the temperature. The hot flue gas however, in carrying out the oil and gas, thermally decomposes and cracks much of the desired product. Furthermore the solids have difficulty in flowing down around the gas engager located at the bottom of the column. Frequently the solids sinter and fuse and jam up the gas introduction apparatus. These processes are also defective in that they still require considerable quantities of cooling water to condense the product vapor.

Other processes utilize an upflow of solids through a vertical reactor with a downflow of heating gas, which may be generated by the combustion of the carbonaceous residue on the mineral matter in the upper part of the column. This permits the removal of much of the product as a liquid by condensing it in direct contact with the cool fresh solids at tthe bottom of the column. This effectively preheats the solids and eliminates the fuel requirement and product condensing problems referred to above. There are many advantages to this latter type of operation, but some mechanical means is required for feeding the solids material into the column and forcing it upwardly therethrough.

One form of solids feeder utilized a horizontally reciprocating piston which discharged the solids into a 90° elbow conduit opening upwardly below the contacting column. Extensive experimentation shows that the pressures or forces necessary to push the solids around this elbow and upwardly through the contacting column are exceptionally high. This results in the crushing of as much as 50 percent of the rock or solids fed to the system.

Another form of solids feeder utilized a pair of screw conveyers disposed at right angles to one another, the horizontal screw receiving solids and discharging them into the bottom of the vertical screw which in turn was supposed to charge the solids into the bottom of the column and move the entire column upwardly. Experimentation with this apparatus shows again that the forces involved are very high and that as much as 50 percent of the solids feed was reduced to fines.

The most successful solids feeding mechanism involves a reciprocating piston feeder supported on a lower trunnion and which is oscillated through an arc between a vertical feeding position coaxially aligned with the contacting column and an inclined feeder charging position angularly disposed from the vertical. In this apparatus the piston feeder receives solids in the inclined position, is oscillated into the vertical position beneath the contacting column, the feeder then discharges the solids upwardly into the column, and then is oscillated back to the angular position to receive further solids. With this mechanism solids crushing is substantially eliminated.

In large scale apparatuses suitable for conducting these heat treating processes commercially, the oscillating-reciprocating piston feeder becomes very large. Piston diameters are of the order of six feet and the vertical movement of the piston is ordinarily of the order of three feet. In order to oscillate such a piston through an arc between the feeding and charging positions, the trunnion is necessarily located twelve to fourteen feet below the highest position of the feeder piston. In order to close off the feed chute against downflow of solids therein while the piston is in the inclined position, and in order to close off the contacting column against downflow of solids when the feeder piston is in the vertical position, a pair of curved plates or "shoes" must extend at least six feet on either side of the feeder cylinder. This requires the construction and machining of a pair of curved plates which are at least as wide as the piston diameter and which are at least three times as long along the arc as the piston diameter. With a six-foot piston this shoe assembly is approximately 7 feet wide and 20 feet long along the arc. The thickness is ordinarily of the order of four to six inches. Close tolerances are required in order to prevent solids entry between the pieces. The tremendous weight, the difficulty in machining during fabrication, and the extreme problems of construction and maintenance of such equipment are obvious.

The present invention is accordingly directed to an improved apparatus for heat treating solids utilizing solids upflow through a contacting column and provided with an improved solids feeding system which is simple to fabricate, easy to maintain, relatively light in weight, and which is approximately one-half the height of the oscillating-reciprocating piston feeder briefly described above.

It is therefore a primary object of this invention to provide an improved apparatus for solids-fluid contacting in which solid to be treated are fed upwardly through a heat treating column countercurrent to a downflow of fluids.

It is a more particular object of this invention to provide such an improved process for the heat treating of solids such as shale, coal, tar sand, and the like to produce hydrocarbon liquids and gases.

It is a specific object of this invention to provide an improved means for injecting solids such as shale into a heat treating zone by means of a solids feeder zone which incorporates a sealing zone superimposed above a loading zone, the zones operating in sequence to feed solids to the heat treating zone.

It is also a specific object of this invention to provide an improved solids or shale feeder disposed below a vertical heat treating zone and which comprises a pair of horizontally reciprocating slide valves disposed immediately above a pair of hemi-cylindrical shale loaders also reciprocable in a horizontal plane to corporate together to provide a solids feeder of minimum moving mass.

Other objects and advantages of the present invention will become apparent to those skilled in the art as the description and illustration thereof proceed.

One embodiment of the present invention comprises an improved shale retorting apparatus in which the crushed shale is moved upwardly as a dense bed successively through a fluid solids disengaging zone and a heat treating or retorting zone countercurrent to a downflow of fluid. It should be understood of course that the present description, relating as it does to shale retorting, is intended as illustrative only and that the apparatus of this invention is equally applicable with the realization of substantially all of the same advantages to other solids-fluid contacting processes in general and to solids heat treating processes in particular. Such processes include the recovery of hydrocarbon gases and oils from tar sand, oil saturated diatomaceous earth, bituminous coal, and the like. The process may also be applied to the gasification of carbonaceous solids at temperatures at between about 1000° F. and 2000° F. by means of a gas containing steam and which may also contain oxygen.

The shale feeder zone of this invention is disposed immediately below and coaxially aligned with the contacting column referred to above. The feeding zone comprises a vertically disposed feeder piston which is reciprocable vertically and movable only along the same axis as the contacting column. A hydraulic cylinder to actuate the feeder piston is disposed immediately below it and firmly supported from the ground in a stationary position. The feeder cylinder in which the feeder piston reciprocates vertically is comprised of a pair of hemi-cylindrical sections, each of which is horizontally reciprocable on a plane supporting surface which is at substantially the same level as the upper face of the feeder piston when it is in its lowest or retracted position. These hemi-cylindrical sections or scoops are moved simultaneously radially inward toward the vertical axis of the contacting column so that their edges contact one another forming a cylindrical section. This is the feeder cylinder and through which the feeder piston moves upwardly to force a fresh volume of raw shale into the contacting column. These scoops may be slidably supported in any manner convenient to the particular structure. The upper outboard edge of each scoop is provided with a flat horizontal plate or guard shoe which is reciprocated with each scoop and which serves to close off the lower outlet opening of the raw shale inlet chute when the scoops are in the feeding position, that is, engaged with each other to form the feeder cylinder. Upon movement of each scoop radially outward to the scoop charging position the shoe unseals the shale chutes thereby delivering a charge of raw shale into each scoop. The amount of shale charged is a very critical variable in this process as will become apparent from the following discussion. The volume of shale is determined by the volume of the scoop, the angle of repose of the raw shale, and the relative size and location of the scoop and the chute opening. With the charges of fresh shale now in the scoops, they are forced radially inward toward one another until their edges engage forming the feeder cylinder which is now filled with raw shale. The feeder position then moves upwardly forcing the fresh charge from the feeder cylinder into the contacting column.

While the scoops are in the outboard or filling position, some means of course must be provided for preventing the bed of shale already forced upwardly into the retort, from flowing downwardly into the open space through which the scoops move. This means is provided by a pair of horizontally reciprocating slide valve plates. These plates move inwardly toward each other until their inboard edges engage on a plane immediately above the top edge of the scoops and the feeder piston at its uppermost position. These plates support the shale and prevent shale downflow when the feeder piston is retracted and the scoops are reciprocated into their charging positions. Preferably the reciprocation of the scoops and the reciprocation of the slide valves are at right angles to one another, but other angles may be utilized. Ordinarily these reciprocations are not along the same direction since the shale chutes open downwardly near the outer extreme of the scoop reciprocation and thus would interfere with the mechanism needed to reciprocate and to support the slide valves.

The sequence of mechanical movements of the five elements referred to above; namely the two slide valves, the two feeder scoops, and the feeder piston; is controlled so that a substantially continuous charging of the scoops and feeding of the retort is accomplished. The sequence of operations is best described by going through a complete cycle beginning with the feeder piston in the upper position after having just delivered a charge of shale into the retort. The slide valves are then closed just above the upper surface of the piston thereby sealing the retort against downflow of solids. The piston is retracted to its lower position and hemi-cylindrical scoops are retracted into the charging position opening the shale chutes thereby introducing a charge of fresh shale into the scoops. The two charging scoops are then extended radially inward to form the feeder cylinder full of shale above the feeder piston and below the slide valves. Then the slide valves are opened, the piston is raised forcing the new charge of shale upwardly into the retort displacing shale already in the retort upwardly. The slide valves are then closed and the cycle repeated.

The shale rock is forced upwardly by this means through the contacting column and successively through a fluid disengaging zone, a shale preheating and product cooling and condensing zone, a shale retorting zone in which spent shale and product fluids are produced, a spent shale combustion and eduction fluid production zone, and an ash cooling and inlet gas preheating zone. Air, together with steam or recycled shale gas, or the like, is introduced at the top of the contacting column and passes downwardly through the aforementioned zones in the reverse order. A countercurrent solids fluid contact is thus maintained. The inlet gas is preheated while cooling the shale ash. This gas is employed in burning the carbonaceous residue of the spent shale and produces the heating and eduction fluid. This fluid heats preheated shale to retorting temperatures and educts the shale gas and oil as a vapor therefrom. The whole eduction gas and product vapor phase is cooled and condensed in the next lower zone causing condensation of the shale oil fraction and preheating of the incoming shale. The vapor and liquid products are removed from contact with the rising shale as separate phases in the disengaging zone.

Because of the active and highly efficient heat exchange between the solids and fluid phases at the top and bottom of the contacting column, the heat generated in the intermediate regions of the column is substantially completely recovered and internally recycled and utilized in preheating the entering gas and solids phase. No outside cooling and condensing media and no outside sources of fuel are required.

The modification briefly described above constitutes a substantial improvement over the oscillating and vertically reciprocating solids feeder in that the feeder cylinder remains at all times in the same horizontal plane and thus no work must be done against gravity in moving it between the feeding and the charging positions. Since there is no movement along an arc and around a trunnion support, the feed chute and contacting column shoes or guards are not curved but flat. They are thus far simpler and cheaper to construct, simpler to install and adjust, and easier to maintain in operation. Because there is no structure required extending to the center of an oscillating arc, the height of the solids feeding mechanism in this invention is reduced to about 50% of that previously required. No heavy trunnion bearings are required and the feeder is very adequately supported on structural steel beams. Because the contacting column itself may now be supported independently through cross beams and columns, the feeder case, which surrounds the feeder mechanism and maintains this mechanism completely submerged in a body of fluid such as shale oil product, may be of very light weight. Furthermore, the mass of the moving equipment in this feeder is reduced to an absolute minimum. The feeder piston actuating element is stationary and the only moving parts are the feeder piston, the feeder cylinder or scoops, and the slide valves. Because of this radical reduction in the mass of moving equipment, the energy consumed in introducing shale into the retort is reduced to an absolute minimum.

Figure 5:
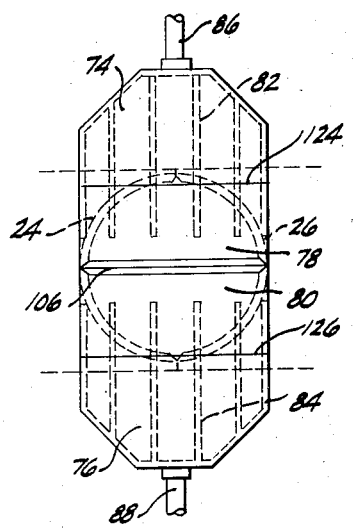
Figure 4:
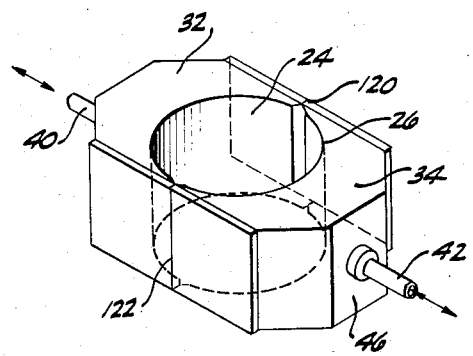

The present invention will be more readily understood by reference to the accompanying drawings in which:

Figure 1 is an elevation view in cross section of the improved solids feeder mechanism of this invention which details the construction of the feeder cylinder and scoops, the scoops being shown in their retracted or charging position, Figure 2 is another elevation view in cross section taken at right angles to the view in Figure 1 and detailing the construction of the slide valves, Figure 3 is a plan view of the feeder scoops showing them in the closed feeding position in which the feeder cylinder is formed and in broken lines showing the open or retracted position in which new shale is charged to the system, Figure 4 is an isometric view of the feeder scoops showing the feeder cylinder and the upper guards or shoes, and Figure 5 is a plan view of the slide valves.

Referring particularly to Figure 1, shale feeder case 10 is shown surrounding the solids feeder mechanism of this invention. Enclosed within the feeder case is feeder piston actuating cylinder 12 resting on support 14. This is a large diameter hydraulic cylinder provided with the conventional hydraulic fluid lines, not shown, for extending and retracting feeder piston 16 which is connected thereto by means of shaft 18. The feeder cylinder in which feeder piston 16 reciprocates is comprised of a lower and upper portion. Lower portion 20 surrounds the feeder piston only when it is in its retracted position as shown in Figure 1. Lower portion 20 is also provided with a pair of stationary lower guards or shoes 22 integrally connected to lower cylindrical portion 20 and extending radially away in the direction of reciprocation of the two hemi-cylindrical sections 24 and 26 which comprise the upper section of the feeder cylinder.

Lower guards 22 constitute, together with the upper surface 23 of piston 16, the bottom of a shale charging zone into which the raw shale is introduced when the hemi-cylindrical sections or scoops 24 and 26 are in the retracted position shown. The sides of the charging zone are flat side walls 29 and 31, the latter being more clearly shown in Figure 2. Their bundled mating edges 25 and 27 are also shown. Integrally attached to the upper outboard edge 28 and 30 of the hemi-cylindrical sections 24 and 26 is a pair of movable upper guards or shoes 32 and 34 which extend away horizontally in the direction of scoop movement. They serve to close the lower outlet openings of shale inlet chutes 36 and 38, respectively, when the hemi-cylindrical sections are in the feeding position as shown in Figure 1.

As indicated briefly above, the volume of shale solids introduced into the charging zone, when the scoops are retracted, must be carefully controlled to avoid introducing a quantity of solids which exceeds the volume of the feeder cylinder when the scoops are extended. Preferably the total volume of solids introduced from each side is equal to the feeder cylinder volume and this may be accomplished charging the scoops with externally premeasured volumes of shale through chutes 21 and 21' having gates 23 and 23' actuated by flow controllers 49 and 49'. Another means of accomplishing the same result is by provision of adjustable baffles 37 and 39 in shale chutes 36 and 38 whereby the location of the surfaces 31 and 33 (and 31' and 33') of the pile of fresh shale which flows into charging zone 29 can be varied. The object of this control is to maintain the empty or void volume 35 (above surfaces 31 and to the left of bevelled edge 25) and volume 37 (above surface 33 and to the right of bevelled edge 27) equal to or greater than the wedge-shaped volumes of solids 45 (below surface 31 and to the right of edge 25) and 47 (below surface 33 and to the left of edge 27). Restated, the portion of the hemi-cylindrical volume of the scoops which is not filled when the accumulation of added solids itself prevents further solids entry is controlled at a value greater than the volume of solids which on charging runs out of the scoops beyond bevelled edges 25 and 27 and in part onto upper piston surface 23. Then the scoops will always extend into the engaged position forming the feeder cylinder upper section and will in this position be completely full of solids.

The hemi-cylindrical sections or scoops are each provided with hydraulic actuating cylinders 41 and 43. These hydraulic cylinders are disposed horizontally and connected by means of shafts 40 and 42 to scoops 24 and 26 by means of end pieces 44 and 46 to which they are connected.

Disposed immediately above scoops 24 and 26 are the slide valves which seal the lower opening of the contacting column against downflow of solids. One of these slide valves 48 is shown in this figure.

Disposed immediately above the solids feeder is contacting column 52 indicated generally here and shown in greater detail in Figure 2 described below.

Referring now to Figure 2, elements here which are also shown in Figure 1 are indicated by the same numbers. The upper detail of contacting column 52 includes a lower disengaging zone 54 provided with a zone of perforations 56 and surrounded by jacket 58 forming a fluid draw-off manifold 60 by means of which fluids are disengaged from the upwardly moving solids mass. Outlet line 62 opens from manifold 60. This entire assembly constitutes the disengaging zone referred to previously. Superimposed above the disengaging zone is the retorting column 64. This column is provided with radial cooling fins 66 which in turn are surrounded by another jacket 68 providing a plurality of vertical passages around the retort for natural or forced convection cooling of the retort wall. Spent solids are discharged over the upper periphery of retort 64. Gases are drawn downwardly into this upward opening, through the retort to maintain the combustion and retorting reactions, and are then disengaged in the disengaging zone as described. The gas flow is maintained by means of a blower taking a suction at conduit 62 and discharging into vapor-liquid separator 63, electrostatic precipitators, sonic separators, and the like to effect the complete separation of the liquid and vapor phases.

Referring to the lower portion of Figure 2, slide valves 48 and 50 are shown. These slide valves are constructed of a pair of closely spaced horizontal plates and have radial lengths slightly greater than the diameter of feeder piston 16. The lower plates 70 and 72 are flat whereas upper plates 74 and 76 are provided with sloping portions 78 and 80 forming a bevelled edge where they extend into the path of upward shale movement. A series of vertical internal webs 82 and 84, shown more clearly in Figure 5, act as stiffeners for the slide valves. A chisel edge 106 is provided where the slide valves meet.

The slide valves are provided with reciprocating shafts 86 and 88 by means of which they are connected to horizontal hydraulic cylinders 87 and 89. By means of these actuating cylinders, the slide valves are reciprocated into and out of the shale flow path and serve to support the mass or column of shale in the contacting column while the feeding scoops 24 and 26 are withdrawn into the retracted position and are being charged with solids.

The slide valves are each supported on a pair of horizontal rollers. The inboard rollers 90 and 92 nearest the vertical axis of the shale of the contacting column are disposed below the slide valves and as near the outer surface of hemi-cylindrical scoops 24 and 26 as possible. The outboard rollers 94 and 96 are disposed above the slide valves and at a distance from the vertical axis of the apparatus greater than those of the inboard rollers. In this way the weight of the supported mass of shale is taken up as leverage between the inboard and outboard rollers and at the same time providing low rolling friction for the slide valves. The inboard and outboard rollers are supported by horizontal beams 98, 100, 102, and 104.

In Figure 2 the apparatus is shown in a position corresponding to the scoop charging part of the cycle as in Figure 1. In other words, the slide valves are projected into engagement at their contacting edges 106 and support the mass of shale in the contacting column. Feeder piston 16 has been lowered to the charging position, and the feeder scoops 24 and 26 are retracted into the position shown in Figure 1. In this position the scoops are being filled with fresh shale and the cycle continues from the corresponding point in the sequence above described.

Referring now to Figure 3, a plan view of the hemi-cylindrical sections or scoops 24 and 26 is shown. The position of the lower outlet opening of the feed chutes is indicated at 110 and 112. The upper surface of upper shoes 32 and 34 is also shown and in this position it is seen how these elements seal the lower outlet openings of shale inlets 110 and 112 when the scoops are in the projected position forming feeder cylinder 114.

When the slide valves are brought into engagement, as previously described and as indicated in Figure 5, then scoops 24 and 26 may be retracted into positions 24' and 26' indicated in Figure 3 by the broken lines. In this position it is seen how the lower outlet openings 110 and 112 of feed chutes 36 and 38 shown in Figure 1 are opened so that fresh shale may flow by gravity downwardly onto the upper surface of feeder piston 16 and lower shoes 22 also indicated in Figure 1. Then when the scoops are projected into engagement as indicated in Figure 3 the masses of shale are brought together filling the upper portion of the feeder cylinder and simultaneously shutting off lower outlet openings 110 and 112 against further shale flow.

In Figure 4 an isometric view of the hemi-cylindrical scoops 24 and 26 is shown in the feeding or engaged position. The feeder cylinder is clearly shown. The upper surfaces of upper shoes 32 and 34 are shown as are the engaging edges 120 and 122 of the hemi-cylindrical scoops. Connecting rods 40 and 42 are also shown as is end member 46.

Referring finally to Figure 5, a plan view of the slide valves is shown in their projected or closed position, stiffening webs 82 and 84 indicated previously are shown, as are connecting rods 86 and 88. The outline of the feeder cylinder formed by the engaged hemi-cylindrical scoops 24 and 26 is indicated in broken lines. Solid lines 124 and 126 indicate the line of intersection of the upper flat surfaces 74 and 76 with the upper sloping surfaces 78 and 80 shown in Figure 2. The bevelled engaging edges 106 of the two slide valves are also shown.

The following data are given by way of illustration of the construction and size of an apparatus according to this invention suitable to fluid contacting of an upflow of solids on a commercial scale, such as in the retorting of oil shale at a rate of about 360 tons per day. The feeder piston diameter is 5.50 feet, and its vertical travel is 2.0 feet. The rate of reciprocation is at about 10 cycles per hour for the 360-ton rate. The slide valves are each 6.0 feet long, having a bevelled portion each 2.75 feet long. The slide valves are 0.66 feet thick from top to bottom and are fabricated from steel plate 1.0 inch in thickness.

The slide valve supporting rollers are 1.10 feet in diameter and are each six feet long. The inboard rollers are disposed 3.72 feet center to center from the vertical axis of the apparatus and outboard rollers are disposed 5.72 feet center to center from that axis.

Although the present invention has been described in detail as applied to a retort for the production of shale oil and gas from oil shale, it must be emphasized that the apparatus of this invention may likewise be applied to the solids-fluid contacting in general in which an upflow of solids is required and that most, if not all, of the above described advantages may be realized in such other applications. Therefore the present invention is not intended to be limited to an apparatus for oil shale retorting.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for contacting comminuted solids with a fluid comprising a vertical column wherein said contacting is effected, the bottom of said column having a coaxial opening through which said solids are introduced upwardly into said column; a solids-feeder cylinder disposed below said opening coaxially therewith; a solids-feeder piston disposed within said cylinder; means for vertically reciprocating said piston within said cylinder; a horizontally disposed plane plate extending radially outward from the axis of said cylinder and having an opening coaxial thereto, said plate being disposed at the level of the highest point of travel of said piston; a pair of hemi-cylindrical scoops supported on said plate, said scoops being capable of being reciprocated outwardly to a solids-charging position and inwardly to a solids-feeding position wherein said scoops mate to form a cylinder coaxially disposed above said piston; means for reciprocating said scoops in said manner; inlet means for introducing solids onto said horizontal plate between said scoops in said solids-charging position; sliding cut-off valve means disposed above said pair of scoops and below said opening in said column; and means for reciprocating said valve means horizontally to place said opening into and out of communication with said solids-feeder piston.

2. An apparatus according to claim 1 wherein said sliding cut-off valve means comprises a pair of plates which reciprocate in opposite directions along a horizontal axis angularly disposed from the axis of reciprocation of said scoops.

3. An apparatus according to claim 1 in combination with means for restricting the volume of solids introduced between said scoops from said inlet means.

4. An apparatus according to claim 1 in combination with an upper shoe connected to the outboard edge of each of said scoops and adapted to close said inlet means when said scoops are extended inwardly to said solids-feeding position.

5. An apparatus for contacting comminuted solids with a fluid comprising a closed feeder case having an upper flat surface with a central solids-outlet openings and a pair of diametrically opposed solids-inlet openings therein; a vertical integral lower cylinder section disposed in the bottom of said feeder case coaxial with said solids-outlet opening; a solids-feeder piston adapted to reciprocate within said lower cylinder section; hydraulic means for so reciprocating said piston; a vertical composite upper cylinder section disposed within said feeder case above and coaxial with said lower cylinder section, said upper cylinder section having substantially the same diameter as said lower cylinder section and comprising a pair of hemi-cylindrical sections; a pair of lower flat shoes extending outwardly from the upper edge of said lower cylindrical section and slidably supporting said hemi-cylindrical sections; hydraulic means for reciprocating said hemi-cylindrical sections outwardly in opposite directions from a solids-feeding position wherein said hemi-cylindrical sections mate to form said upper cylindrical section to a solids-charging position outward of said solids-inlet openings; an upper flat shoe extending outwardly from the top edge of each of said hemi-cylindrical sections for such a distance as to close said solids-inlet openings when said hemi-cylindrical sections are in said solids-feeding position; a pair of slide valves disposed within said feeder case immediately above said upper cylindrical section and reciprocable horizontally to close said solids-outlet opening when said hemi-cylindrical sections are in said solids-charging position; hydraulic means for so reciprocating said slide valves; and a solids-fluid contacting vessel disposed above said feeder case, said vessel having a solids-inlet opening in register with said solids-outlet opening in said feeder case.

6. An apparatus according to claim 5 in combination with controllable means for restricting the volume of solids which flows through said solids-inlet openings to value not greater than the volume of said upper cylinder section.

7. An apparatus according to claim 5 in combination with a lower inboard roller and an upper outboard roller for supporting said slide valves in a rigid horizontal position.

8. An apparatus according to claim 5 wherein said contacting vessel comprises a lower disengaging section, an upper contacting section, separate means for introducing fluids into and withdrawing solids from the top of said contacting section, and means for withdrawing fluid from said disengaging section.

9. An apparatus according to claim 5 wherein all of the said hydraulic means operate independently of one another.

References Cited in the file of this patent
UNITED STATES PATENTS

| | | |
|---|---|---|
| 2,011,620 | Erb | Aug. 20, 1935 |
| 2,501,153 | Berg | Mar. 21, 1950 |
| 2,640,014 | Berg | May 26, 1953 |
| 2,640,019 | Berg | May 26, 1953 |